Feb. 14, 1933. W. L. WRIGHT 1,897,098
MOTION PICTURE PROJECTOR
Original Filed Sept. 3, 1929
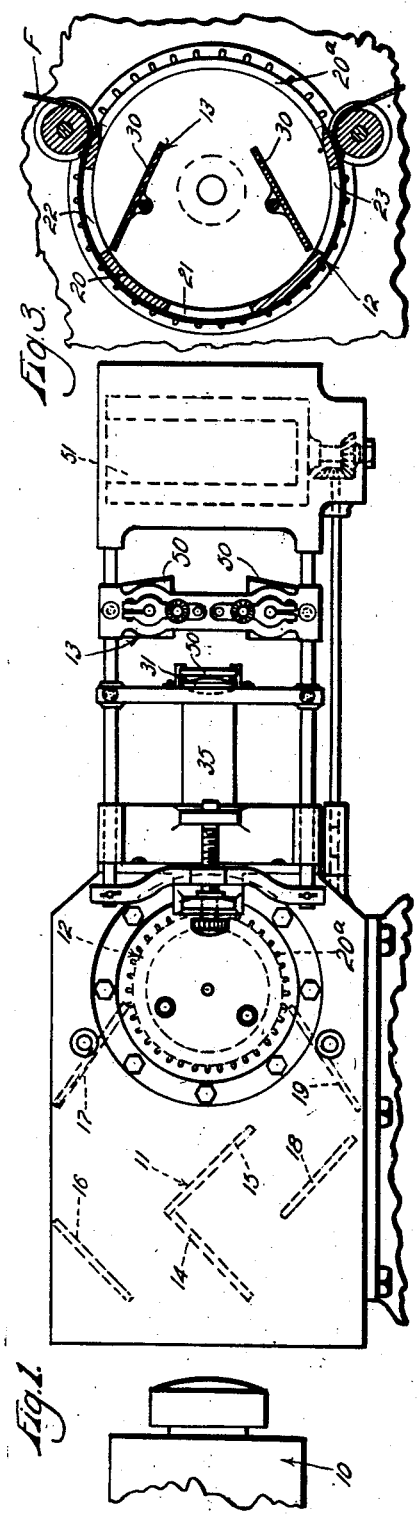
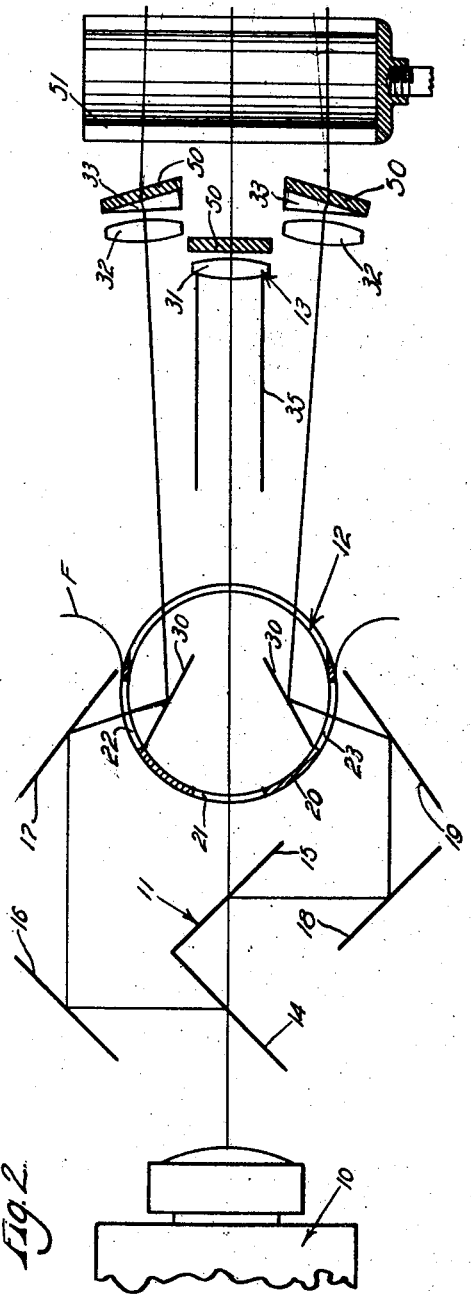
Inventor
Walter L. Wright
by W. H. Maxwell
his Attorney Patented Feb. 14, 1933

1,897,098

UNITED STATES PATENT OFFICE

WALTER L. WRIGHT, OF SANTA MONICA, CALIFORNIA, ASSIGNOR TO SYNCHROME CORPORATION, OF LOS ANGELES COUNTY, CALIFORNIA, A CORPORATION OF CALIFORNIA

MOTION PICTURE PROJECTOR

Application filed September 3, 1929, Serial No. 390,121. Renewed July 11, 1932.

This invention has to do with an optical system for the projection of motion pictures and has particular reference to a system for the projection of color motion pictures using film in which the pictures are in sets or groups, each group including pictures of different color values of a subject taken simultaneously from a common point of vision.

It is a general object of the present invention to provide a system of projection of the character mentioned by which it is possible to get full and efficient illumination.

It is a further object of the invention to provide a system for handling film of the character mentioned employing a single source of light in a simple, effective and efficient manner.

Another object of the invention is to provide an optical system for handling a plurality of shafts of light to project them through spaced pictures and bring them together in register on a screen in a particularly simple, compact and efficient manner.

It is another object of the invention to provide an optical system of the character mentioned employing corrective prisms located so that they do not interfere with the action of the lenses of the system.

A further object of the invention is to provide an optical system embodying three spaced shafts of light and a single shutter, the shafts of light and shutter being related so that the shafts of light are simultaneously intercepted by the shutter.

The various objects and features of my invention will be best and more fully understood from the following detailed description of a typical form and application of the invention, throughout which description reference is had to the accompanying drawing, in which:

Fig. 1 is a side elevation of a picture projecting apparatus embodying the present invention. Fig. 2 is a diagrammatic view illustrating the optical system provided by the invention, and Fig. 3 is a detailed sectional view of the film carrying portion of the apparatus.

The present invention is especially suited for use in handling a motion picture film F in which the pictures are in groups or sets, each group comprising several, say, three pictures of a subject taken simultaneously from a common point of vision, the several pictures being of different chromatic values of the subject and being spaced apart longitudinally of the film, preferably distances corresponding to a single picture area. In the following disclosure of the invention it will be considered that the film F is of the character just mentioned.

The invention provides, generally, a source of light 10, light dividing means 11 operable to receive a shaft of light from the source of light 10 and divide it into a plurality of spaced shafts to be projected through the several pictures of a group on the film F, means 12 for handling the film F so that the several pictures of a group are held in a predetermined position to be in the path of the shafts of light directed by the means 11, means 13 receiving the shafts of light after they have passed through the film F and directing them onto a screen in register, and means for simultaneously interrupting the several shafts of light.

The source of light 10 may be of the type ordinarily employed in motion picture apparatus; for example, it may be an ordinary arc lamp including a suitable arrangement of reflector and condenser lens. The source of light 10 may be considered to direct or project a single shaft of light in which the beams are substantially parallel.

The means 11 provided for dividing the light from the source 10 into a plurality of shafts for projection through the pictures on the film F includes two light dividers 14 and 15 angularly arranged one behind the other in the path of the shaft of light from the source 10, a first reflector 16 receiving light reflected by the divider 14, and a second reflector 17 receiving light from the first reflector 16 and directing it through the film F, a first reflector 18 receiving light reflected by the divider 15, and a second reflector 19 receiving the light from the reflector 18 and directing it through the film F. The first light divider 14 is arranged at an angle, say, at forty-five degrees, across the shaft of light from the source 10 and operates to pass part of the light and reflect off part of the light at an angle, say, upwardly. The second light divider 15 is arranged at an angle, say, at forty-five degrees, in the path of the shaft of light passed by the first divider 14, and passes part of the light and projects off the light that is not passed at an angle, say, downwardly. The two first reflectors 16 and 18 receive the shafts of light reflected upwardly and downwardly by the dividers 14 and 15, respectively, and reflect them forward, or in the general direction of the shaft projected by the source of light 10. The second reflectors 17 and 19 receive the reflected shafts and direct them inwardly and forward so that they converge and are projected toward a center coincident with the shaft of light projected by the source 10.

The light dividers 14 and 15 may be of various types commonly employed in optical systems of this character, for instance, they may be partially silvered plates which operate to receive a shaft of light to pass part of it and reflect off the rest. The reflectors that have been referred to are preferably front surface reflectors of any suitable type. In practice I have used chromium plated reflectors.

The film handling means 12 operates to hold the film F so that the portion carrying the group of pictures to be projected is curved about the center toward which the shafts of light are projected by the reflectors 17 and 19. The means 12 may vary in construction, it being preferred to employ a construction such as is fully set forth and claimed in my co-pending application entitled Construction for cameras, projectors, etc., filed September 25, 1928, Serial No. 308,241. Further, it is to be understood that the means 12 may be incorporated or arranged in combination with any suitable means for intermittently advancing the film to bring successive groups of pictures into position for projection. For the purpose of illustrating the principles of the present invention, I have shown the film arranged over an annular guide plate 20 provided with three apertures 21, 22 and 23. The aperture 21 is in line with the shaft of light coming directly from the source of light 10 after having passed the dividers 14 and 15, the aperture 22 being in the path of the light reflected by the reflector 17 and the aperture 23 being in the path of light reflected by the reflector 19.

It is to be understood, of course, that the film F is arranged over the guide 20 so that the several pictures of the group to be projected are in register with the apertures 21, 22 and 23.

The means provided for receiving the light projected through the pictures of the film includes, generally, reflectors 30 located within the guide 20 to intercept and reflect off the light passed through the apertures 22 and 23 before it reaches the center or intercepts the shaft being projected through the aperture 21. The reflectors 30 are arranged at an angle to the shafts of light passing through the apertures 22 and 23 to reflect the shafts in a forward direction, preferably forward and somewhat outward, as shown in the diagram of Fig. 2. By directing the reflected shafts somewhat outward as well as forward, it is possible to employ large lenses 32 and get maximum illumination.

The means 13 further includes a projecting lens 31 in the path of light projected through the aperture 21, and projecting lenses 32 located in the path of the shafts of light reflected by the reflectors 30. I may use single combination lenses. Suitable corrective devices, for instance, prisms 33, are arranged to receive the light after passing the lenses 32 to direct the reflected shafts, that is, the shafts passed by the apertures 22 and 23, somewhat inwardly so that they will fall upon the screen in register with the shaft passing directly through the system. In practice suitable shields 35 may be arranged in the means 13, for instance, between the reflectors 30 and the lenses 32. Further, where the film F does not carry the color values directly but merely images of different color values of the subject, suitable chromatic means in the form of filters 50 may be provided in the system to give the several shafts of light proper color values so that the resultant picture appearing on the screen combines the color values to produce a picture in natural colors. In the preferred arrangement the filters 50 are located to pass the light after it has passed the lenses and prisms. It is to be understood that the apparatus just described may be constructed so that the various parts can be suitably regulated or adjusted. The present invention is concerned with the optical system in a broad sense and is not concerned with details of construction, and therefore such details are omitted from this specification.

A shutter 51 is arranged at a suitable point in the system, preferably beyond the lenses and filters as shown in the drawing. I prefer to use a barrel type shutter arranged so that its axis of rotation intersects the axes of the several shafts of light. In the case illustrated, where the several shafts are one above the other, the shutter is arranged vertically. With this arrangement the several shafts of light are simultaneously interrupted. It is to be understood that the shutter is driven in proper timed relation to the film moving means; in the case illustrated it is driven in proper timed relation to the movement sprocket 20ᵃ which engages the film at the film guide 20.

Having described only a typical, preferred form and application of my invention, I do not wish to limit myself to the specific details set forth, but wish to reserve to myself any changes or variations that may appear to those skilled in the art or fall within the scope of the following claims:

Having described my invention, I claim:

1. In an optical system, a film support, a film carried by the support about a center, means directing spaced shafts of light through pictures on the film toward said center and directing one of the shafts of light through said center and toward a screen, means reflecting another of said shafts of light before it reaches said center to direct it in the general direction of the first-mentioned shaft, and means intercepting the shafts directed toward the screen and directing them into register on the screen.

2. In a projecting system, a film support, a film carried by the support about a center, means directing three spaced shafts of light through pictures on the film toward said center, the middle shaft of light continuing through said center and toward a screen, and means reflecting the other two shafts of light before they reach said center to direct them in the general direction of the first-mentioned shaft, and means whereby the shafts passing toward the screen are focused and registered on the screen.

3. In an optical system, a film support, a film held by the support curved about a center, means directing three spaced shafts of light through pictures on the film toward said center and directing the center shaft through said center toward a screen, reflectors within the curved portion of the film to reflect the other two shafts of light before they reach said center, and means whereby the shafts passing toward the screen are focused and registered on the screen including a lens in the path of each shaft of light after it has passed the film.

4. In a projecting system, a film support having apertures, a film held by the support curved about a center, means directing three spaced shafts of light toward said center, through the apertures in the support, through pictures on the film and directing the middle shaft through said center and toward a screen, reflectors within the curved portion of the film to reflect the other two shafts of light before they reach said center and reflect them in the direction of the screen, color filters in the paths of the shafts of light, and means whereby the shafts passing toward the screen are focused and registered on the screen including a lens in the path of each shaft of light after it has passed the film.

5. In an optical system, a screen, a film support, a film carried by the support curved about a center, means directing three spaced shafts of light through pictures on the film and toward said center and directing the middle shaft through said center and toward the screen, reflectors within the curved portion of the film to reflect the other two shafts of light before they reach said center so that they pass in the direction of the screen and diverge slightly, means correcting the divergence of said other two shafts of light so that all three shafts of light register at the screen, and a lens in each shaft of light as it passes toward the screen.

6. A projector including, a screen, two light dividers arranged at opposite angles in a single shaft of light directed toward the screen, first reflectors directing the shafts reflected off by the dividers so that they are substantially parallel with the shaft passed by the dividers, second reflectors receiving the shafts from the first reflectors and directing them toward a center intersected by the shaft passed by the dividers, third reflectors receiving the shafts from the second reflectors before they reach said center and directing them in the direction of the screen and so that they are slightly divergent, a lens in the path of each shaft directed toward the screen, means in the reflected shafts causing them to register at the screen with the shaft passed by the dividers, and a film arranged to extend between the second and third reflectors and through the shaft passed by the dividers.

In witness that I claim the foregoing I have hereunto subscribed my name this 12th day of July, 1929.

WALTER L. WRIGHT.